United States Patent
Cretegny et al.

(10) Patent No.: US 9,186,742 B2
(45) Date of Patent: Nov. 17, 2015

(54) MICROWAVE BRAZING PROCESS AND ASSEMBLIES AND MATERIALS THEREFOR

(75) Inventors: Laurent Cretegny, Niskayuna, NY (US); Jeffrey Jon Schoonover, Delmar, NY (US)

(73) Assignee: General Electric Company, Niskayuna, NY (US)

( * ) Notice: Subject to any disclaimer, the term of this patent is extended or adjusted under 35 U.S.C. 154(b) by 2058 days.

(21) Appl. No.: 12/362,948

(22) Filed: Jan. 30, 2009

(65) Prior Publication Data

US 2010/0193574 A1    Aug. 5, 2010

(51) Int. Cl.

| B23K 10/00 | (2006.01) |
|---|---|
| B23K 1/005 | (2006.01) |
| B23K 1/00 | (2006.01) |
| B23K 35/02 | (2006.01) |
| B23K 35/30 | (2006.01) |
| B23K 35/36 | (2006.01) |
| B23K 35/362 | (2006.01) |
| B23K 35/38 | (2006.01) |
| C22C 19/05 | (2006.01) |

(52) U.S. Cl.
CPC .............. *B23K 1/005* (2013.01); *B23K 1/0018* (2013.01); *B23K 35/025* (2013.01); *B23K 35/0222* (2013.01); *B23K 35/0244* (2013.01); *B23K 35/304* (2013.01); *B23K 35/3602* (2013.01); *B23K 35/362* (2013.01); *B23K 35/3613* (2013.01); *B23K 35/38* (2013.01); *C22C 19/058* (2013.01)

(58) Field of Classification Search
CPC ............. B23K 1/005; H05H 1/26; H05H 1/46
USPC .............. 219/121.4, 121.43, 121.48, 121.59; 118/723 R; 204/298.38; 427/446, 455, 427/456, 461, 488, 491; 228/233.31, 228/263.45, 262.45
See application file for complete search history.

(56) References Cited

U.S. PATENT DOCUMENTS

| 5,567,243 | A | * | 10/1996 | Foster et al. | ................... 118/730 |
| 5,571,577 | A | * | 11/1996 | Zhang et al. | ................... 427/575 |
| 5,847,335 | A | | 12/1998 | Sugahara et al. | |
| 5,985,035 | A | * | 11/1999 | Tamura et al. | ................ 118/724 |
| 6,007,105 | A | | 12/1999 | Dietle et al. | |
| 6,054,693 | A | | 4/2000 | Barmatz et al. | |
| 6,217,724 | B1 | * | 4/2001 | Chu et al. | ................. 204/192.37 |
| 6,365,885 | B1 | | 4/2002 | Roy et al. | |
| 6,512,216 | B2 | | 1/2003 | Gedevanishvili et al. | |
| 6,605,160 | B2 | | 8/2003 | Hoskin | |
| 6,905,945 | B1 | | 6/2005 | Barmatz et al. | |
| 7,227,097 | B2 | | 6/2007 | Kumar et al. | |
| 7,326,892 | B1 | * | 2/2008 | Cretegny et al. | .............. 219/679 |

(Continued)

*Primary Examiner* — Mark Paschall
(74) *Attorney, Agent, or Firm* — John P. Darling

(57) ABSTRACT

A brazing process and assembly utilizing microwave radiation and a plasma generator that is heated by microwave radiation and generates a localized plasma capable of selectively heating and melting a braze alloy. The plasma generator contains a microwave-susceptible material that is susceptible to heating by microwave radiation, and a plasma-generating material capable of volatilizing and generating the plasma when the plasma generator is subjected to heating and microwave radiation. The brazing process includes applying a braze material to a surface of a substrate, positioning the plasma generator in proximity to the braze material, and then subjecting the plasma generator to microwave radiation to volatilize the plasma-generating material and generate a plasma that melts the braze alloy within the braze material.

20 Claims, 5 Drawing Sheets

(56) References Cited

U.S. PATENT DOCUMENTS

| | | |
|---|---|---|
| 2002/0045053 A1 | 4/2002 | Hoskin |
| 2006/0071053 A1 | 4/2006 | Garimella |
| 2008/0083748 A1 | 4/2008 | Thyssen |
| 2008/0141825 A1 | 6/2008 | Thyssen et al. |
| 2008/0142575 A1 | 6/2008 | Cretegny |
| 2008/0145566 A1 | 6/2008 | Cretegny |
| 2009/0014505 A1 | 1/2009 | Cretegny et al. |

* cited by examiner

MICROWAVE BRAZING PROCESS AND ASSEMBLIES AND MATERIALS THEREFOR

CROSS REFERENCE TO RELATED APPLICATIONS

This patent application is related to U.S. patent application Ser. Nos. 11/611,259, 11/611,297 (now U.S. Pat. No. 7,946,467) and Ser. No. 11/611,326, each filed Dec. 15, 2006. The contents of these prior applications are incorporated herein by reference.

BACKGROUND OF THE INVENTION

This invention generally relates to braze materials and brazing processes, such as for use in the manufacturing, joining, coating, repair, and build-up of superalloy components. More particularly, this invention relates to a brazing process that utilizes microwave radiation and the generation of a plasma to promote localized heating and melting of a braze alloy.

Nickel, cobalt, and iron-base superalloys are widely used to form high temperature components of gas turbine engines. While some high-temperature superalloy components can be formed as a single casting, others are preferably or necessarily fabricated by other processes. As an example, brazing can be used to fabricate certain gas turbine components, such as high pressure turbine nozzle assemblies. Brazing is also used to repair cracks and other surface flaws and damage, build up surfaces to restore desired dimensions, and form protective coatings on gas turbine engine components. Brazing techniques of these types encompass heating a braze alloy, typically in the form of a braze alloy powder, a paste or tape containing a braze alloy powder, or a sintered preform of a braze alloy powder, to a temperature above the melting point of the braze alloy but sufficiently below the melting point of the material being brazed to avoid damaging and/or reducing desired properties of the material. (As used herein, "melting point" is meant to encompass the incipient melting point for alloys that do not have a true melting point but instead have a melting range.) For example, brazing temperatures are often limited to avoid grain growth, incipient melting, recrystallization, and/or unfavorable phase formation in the alloy or alloys being brazed.

In situations where a brazement must have a composition and properties similar to the substrate being brazed, the braze alloy will typically have a composition essentially or nearly the same as the substrate, but modified to contain one or more melting point suppressants, such as boron and/or silicon, which form low melting eutectics with the substrate material. In the past, braze alloy powders have been prepared by combining their alloying constituents through such processes as atomization and mechanical alloying to yield a powder whose particles have a uniform composition. For example, EPO456481 reports a process in which a titanium-based braze alloy powder is formed by mechanically alloying powders of each elemental constituent of the braze alloy, including powders of nickel and/or copper as the melting point depressant(s), to create a presumably uniform distribution of the elements in the braze alloy powder.

A difficulty encountered when brazing certain alloys is the tendency for some melting point depressants to form embrittling phases, such as chromium borides that form when brazing chromium-containing superalloys. As a result, brazing is not an appropriate manufacturing or repair process for some applications, particularly many components in the hot gas path of a gas turbine engine. In any case, the amounts of melting point depressants contained in a braze alloy are intentionally limited and sometimes partitioned to minimize their detrimental effects. An example of the latter is the use of a braze alloy system comprising two braze powders, one containing one or more melting point depressants and the other nominally having the same composition as the component being brazed. The higher-melting powder acts as a sink for the excess melting point depressants in the lower-melting powder during and after the brazement is formed. However, segregation of the two powders can occur during the brazing process, with the lower-melting powder taking most of the working volume of the brazement and displacing the higher-melting powder. If this occurs, an excess of melting point depressants will be present in the brazement, which in turn affects the mechanical properties of the brazement.

Microwave brazing is currently been investigated as a potential candidate for eliminating issues associated with conventional brazing techniques. For example, microwave heating has the potential for localizing heat in the braze alloy and selected areas of a component, which reduces the risk of degrading desired properties of the component. Two approaches have generally been proposed for microwave brazing. A first entails the use of a susceptor (e.g., SiC enclosure) that is heated when exposed to microwave energy and, in turn, transfers the heat to the component by radiation. Drawbacks to this approach are lack of local heating of the braze alloy only, as an entire region of the component is inevitably heated, and significant heat loss from radiation in directions away from the intended brazement. A second approach entails direct microwave heating of a braze alloy powder, which is more susceptible to absorbing microwave energy than bulk metals that generally reflect microwaves. Because typical braze alloy compositions do not couple sufficiently with microwave energy to become fully melted during a microwave treatment, braze powders have been proposed that contain particles that are sufficiently small to be highly susceptible to microwave radiation. This approach is disclosed in commonly-assigned U.S. patent application Ser. Nos. 11/564,898, 11/609,473, and 11/469,567. Another approach is to produce a braze powder containing one or more microwave coupling enhancers that are more highly susceptible to microwave radiation than the base alloy composition of the braze powder. For example, commonly-assigned U.S. Pat. No. 7,326,892 to Cretegny et al. discloses the addition to a braze alloy powder of materials capable of behaving as microwave coupling enhancers, such as silicon, germanium, gallium, cobalt, iron, zinc, titanium, carbon (e.g., carbon nano-tubes or fine graphite powder), aluminum, tantalum, niobium, rhenium, hafnium, molybdenum, and silicon carbide (SiC). Powders of the microwave coupling enhancers can be intermixed with a powder of the braze alloy, or the braze alloy can be alloyed to contain one or more microwave coupling enhancers.

Even with the above advancements, there is an ongoing desire to further develop processes for heating braze powders by microwave radiation. In particular, it would be desirable if a braze alloy powder could be fully melted by localized microwave radiation without the presence of microwave coupling enhancers admixed with the powder. In doing so, any impact that such enhancers might have on the mechanical properties of the resulting brazement could be eliminated. In addition, such a capability would allow for broader use of brazing processes and technology, especially in the manufacture and repair of gas turbine engine components.

BRIEF DESCRIPTION OF THE INVENTION

The present invention generally provides a brazing process that utilizes microwave radiation, and in particular a brazing process and assembly that makes use of a separate susceptor material that is heated by microwave radiation and generates a localized plasma capable of selectively heating and melting a braze alloy.

According to one aspect of the invention, the brazing assembly includes a braze material comprising a braze alloy of a metallic material, and means for generating a plasma when subjected to heating and microwave radiation. The plasma generator comprises a microwave-susceptible material that is susceptible to heating by microwave radiation, and further comprises a plasma-generating material capable of volatilizing and generating the plasma when the plasma generator is subjected to heating and microwave radiation.

According to another aspect of the invention, the brazing process includes applying a braze material to a surface of at least a first substrate, and positioning in proximity to the braze material a plasma generator that comprises a microwave-susceptible material and a plasma-generating material. The microwave-susceptible material is susceptible to heating by microwave radiation, and the plasma-generating material is capable of volatilizing and generating a plasma. The plasma generator is then subjected to microwave radiation to volatilize the plasma-generating material and generate a plasma that melts a braze alloy of the braze material. The molten braze alloy is then allowed to cool, solidify, and form a solid brazement.

As described above, the present invention has the ability to significantly promote heating and complete melting of a braze alloy through the use of microwave radiation, even though the braze alloy itself may not be sufficiently susceptible to microwave radiation to become completely melted solely through the effect of microwave radiation. Furthermore, melting of the braze alloy is achieved without admixing the braze alloy with microwave-susceptible materials that might detrimentally influence the properties of the resulting brazement. Instead, a microwave-susceptible material remains separate from the braze alloy, and is combined with a plasma-generating material that, when sufficiently heated, generates a localized plasma capable of melting the braze alloy. The plasma is then substantially if not entirely responsible for heating and melting the braze alloy that, once cooled and solidified, forms a brazement capable of being free of undesirable or otherwise unintended inclusions and phases. Furthermore, the invention can be applied to various processes in which heating and melting of a alloy is desired, for example, to form a coating on a surface, repair or build-up a surface, or metallurgically join components by brazing.

In view of these benefits, the present invention is particularly advantageous for use in coating, joining, and crack-filling (repairing) of superalloy components, including those found in the hot gas path of gas turbine engines. The invention is believed to be useful in joining, coating, and repair applications in which a braze alloy may be required to flow over a large surface area before solidifying.

Other aspects and advantages of this invention will be better appreciated from the following detailed description.

DETAILED DESCRIPTION OF THE INVENTION

The invention will be described with reference to processing of components for gas turbine engines, and particularly the fabrication, coating, buildup, and repair of such components with a braze material. However, the invention has application to a variety of components, materials, and processes other than those discussed, and such variations are within the scope of this invention.

Figure 1:
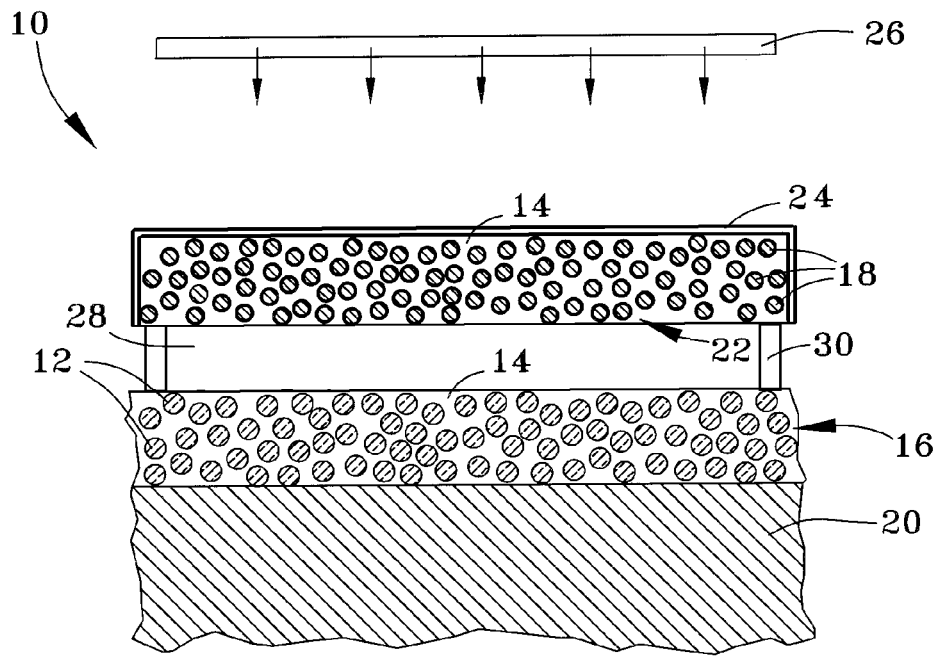
FIG. 1 schematically represents a braze material applied to a surface of a substrate to form a coating on the surface, and a plasma generator spaced apart from the braze material in accordance with an embodiment of the present invention.
Figure 2:
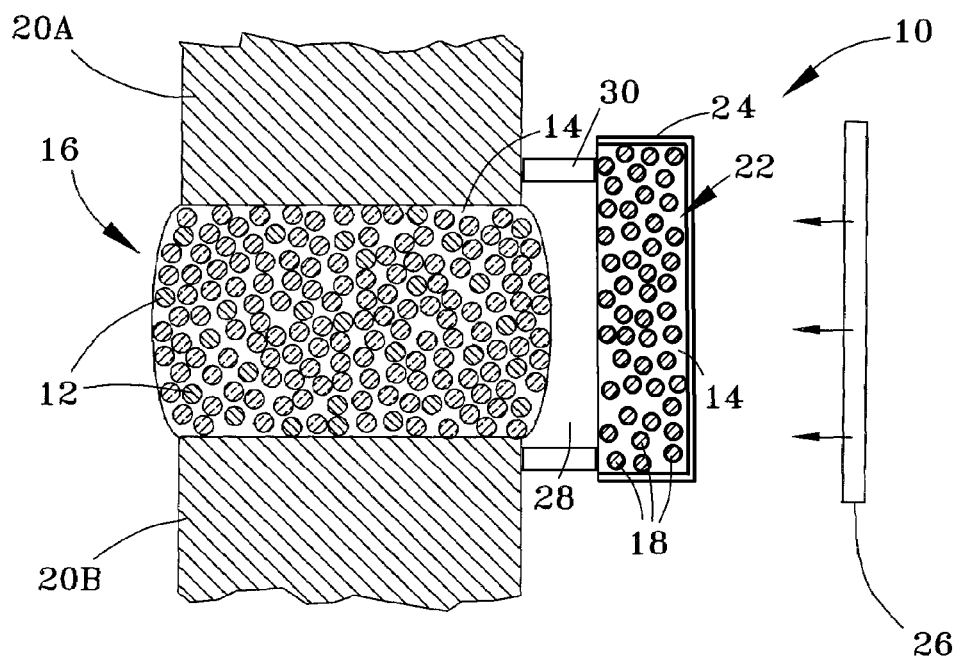
FIG. 2 schematically represents a braze material and a plasma generator similar to those of FIG. 1, but with the braze material placed between a pair of substrates for the purpose of metallurgically joining the substrates in accordance with another embodiment of the present invention.
Figure 3:
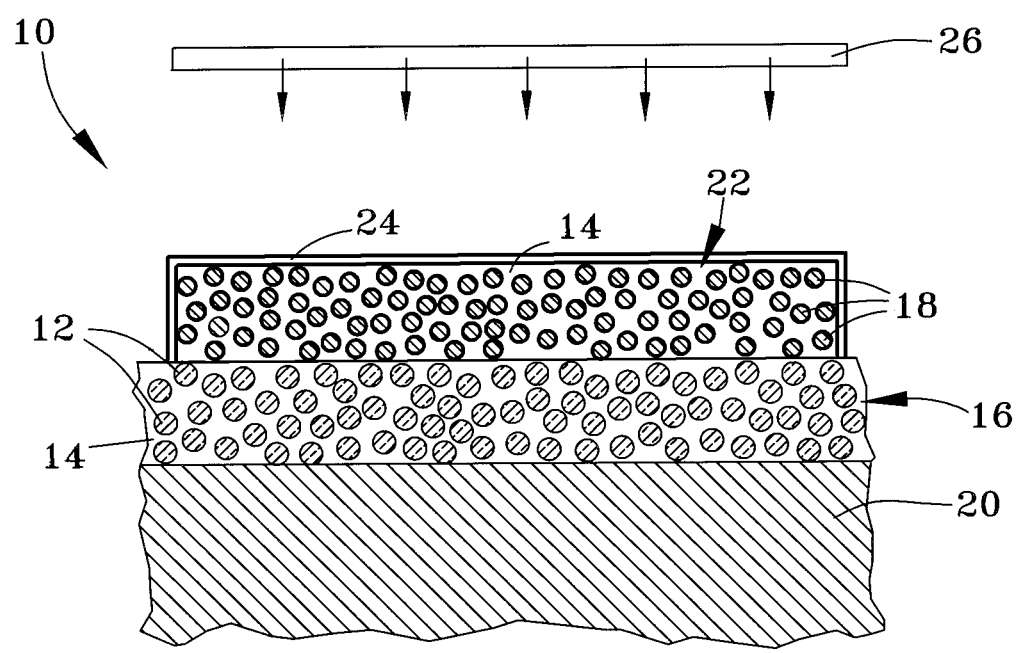
FIG. 3 schematically represents a braze material applied to a surface of a substrate to form a coating on the surface, and a plasma generator in direct contact with the braze material in accordance with another embodiment of the present invention.

FIGS. 1 through 3 depict embodiments of this invention in which consistent reference numbers are used to identify functionally similar features. In particular, FIGS. 1 through 3 depict an assembly 10 for performing a brazing process during which a plasma is generated by microwave radiation-induced heating technique. FIGS. 1 and 3 schematically represent a braze material 16 on a surface of a substrate 20 for the purpose of repairing, building-up or forming a coating on the substrate 20, and FIG. 2 schematically represents a braze material 16 between and contacting opposing surfaces of two substrates 20A and 20B to be metallurgically joined with the braze material 16. The substrates 20 and 20A-B may be formed of superalloys, whose compositions will depend on the particular type of component and its anticipated operating conditions. Various other metallic and nonmetallic materials are also possible for the substrates 20 and 20A-B, and are therefore within the scope of the invention.

In FIGS. 1 through 3, the braze material 16 is represented as containing a braze alloy in the form of particles 12, which are shown dispersed in an optional binder 14. The braze particles 12 are preferably formed entirely of one or more metallic materials. As will be discussed in more detail below, the metallic material of the particles 12 may be the same or different from the composition(s) of the substrate(s) 20, 20A and 20B being brazed. The binder 14 can be selected and used in an amount (for example, about 5 to about 15 percent by volume) so that the braze material 16 is in the form of a paste or a relatively pliable tape to facilitate application of the braze material 16 to the surface or surfaces of the substrates 20 and 20A-B. Alternatively, a paste of the braze material 16 can be dried to form a relatively rigid mass. Another alternative is to form the braze material 16 by sintering the particles 12, yielding a sintered preform that may contain residue of the binder 14 if initially present and then burned off during the sintering process. Finally, the braze alloy of the braze material 16 could be in a form other than particles, for example, a fine fibrous mesh of a filaments formed of a braze alloy.

The braze particles 12 can be formed of a variety of materials, limited only by the requirement that their composition (or compositions) should be compatible with the material of the substrates 20, 20A, or 20B that it contacts while at the maximum heating temperature required to form a repair or coating (FIGS. 1 and 3) or braze joint (FIG. 2) with the braze alloy. Compatibility is assured if the particles 12 have the very same composition as that of its substrate 20 or 20A-B, though suitable compatibility can also be achieved if the particles 12 and substrates 20/20A-B do not have compositions prone to detrimental interdiffusion at elevated temperatures that would lead to loss of desired mechanical or environmental properties. The braze alloy from which the metallic particles 12 are formed may be a conventional braze alloy (for example, Ni-19Cr-10Si, AMS4777, etc.) that contains significant amounts of one or more melting point depressants (such as boron or silicon), a superalloy such as of the type used in turbine applications (for example, IN718, René N5, René N4, René 142, René 80, etc.), or an alloy whose base composition is a superalloy modified to contain limited additions of one or more melting point suppressants (for example, a superalloy with an addition of about 1 to about 5 weight percent boron, about 1 to about 10 weight percent silicon, or another melt suppressant). As such, the particles 12 may contain one or more melting point suppressants. However, a preferred aspect of the invention is that the particles 12 are not required to contain melting point suppressants at levels that might lead to an unacceptable loss of properties in the substrates 20 and 20A-B if a significant amount of the suppressant was to diffuse into the substrates 20 and 20A-B during heating of the particles 12 and/or later during the life of the substrates 20 and 20A-B. Instead, a significant advantage of the invention is that the metallic particles 12 may have the very same superalloy composition (and therefore also the same melting temperature) as the substrate(s) 20/20A-B being brazed. Therefore, the terms "braze" and "brazing" as used herein are not limited to the conventional limitation of an operation performed at a temperature below the melting point of the metal being brazed. Moreover, from the following discussion it will become apparent that a preferred aspect of the invention is the ability to selectively heat the braze particles 12 and not the surrounding bulk substrates 20 and 20A-B. As a result, particles 12 having the very same composition as the substrates 20/20A-B can be melted, while leaving the bulk material of the substrates 20/20A-B unaffected.

FIGS. 1 through 3 also schematically represent what will be referred to as a plasma generator 22, which is shown either spaced apart from or in direct contact with the braze material 16. The plasma generator 22 is represented as containing a particulate material 18 dispersed in a binder 14, which is preferably the same though may differ from the binder 14 of the braze material 16. Similar to the braze material 16, the types, relative amounts, and treatment of the binder 14 and particulate material 18 in the plasma generator 22 can be selected and used in an amount (for example, about 5 to about 15 percent binder by volume) so that the plasma generator 22 is in the form of a paste, a relatively pliable tape, or a dried mass.

As will be discussed in greater detail below, the particulate material 18 is susceptible to heating by microwave radiation 26 as a result of its particle size and material. As such, the particulate material 18 will be referred to has a susceptor 18. Preferred microwave-susceptible materials for the susceptor 18 are believed to be ceramic and graphite materials, though the use of metallic materials is also foreseeable. Particular materials of interest are those that are highly susceptible to microwave radiation at brazing temperatures, and include graphite and ceramic materials such as the oxides, carbides, and nitrides of aluminum, manganese, nickel, copper, tungsten, tantalum, chromium, and iron. Of these, alumina ($Al_2O_3$), silicon carbide (SiC), nickel oxide (NiO), manganese dioxide ($MnO_2$), and graphite are believed to be particularly suitable. It should be noted that alumina exhibits low susceptibility to microwave fields at room temperature, but becomes highly susceptible at elevated temperatures. The susceptor 18 is preferably formed entirely of one or more of these microwave-susceptible materials, though it is foreseeable that microwave-susceptible materials could form limited portions of the susceptor 18.

The binder 14 contained in the plasma generator 22 and optionally in the braze material 16 is preferably formed of a composition that when sufficiently heated will volatilize and, if heated in a sufficiently low-pressure atmosphere, is capable of generating vapors at a localized pressure that is higher than the surrounding atmosphere. The brazing process of this invention is preferably, though not necessarily, performed in a vacuum. Binders with very high vapor pressures are not preferred as they will tend to evaporate too fast and not provide a sustained supply of vapor to form the plasma at high temperatures. If also present in the braze material 16, the binder 14 should also burn off without leaving any residue so that the interior of the resulting brazement is not contaminated by binder residue. A particular example of a suitable binder meeting these criteria is VITTA GEL®, a water-based organic polymeric binder commercially available from the Vitta Corporation. Other types of binders, and particular other water-based organic polymeric binders, could foreseeably be used. According to a particular aspect of the invention, if subjected to microwave radiation while in a vacuum, these vapors become ionized by the microwave field and form a plasma capable of melting the braze alloy particles 12 of the adjacent braze material 16. Volatile constituents of the braze material 16, including the binder 14 (if still present) and constituents released as the particles 12 melt, may also volatilize and become ionized to further intensify the plasma. As a result, the temperature of the molten fraction of the particles 12 becomes sufficiently superheated to thoroughly melt the remaining particles 12 and cause the melt to flow on the substrate 20 or between the substrates 20A and 20B. While not specifically required, the VITTA GEL® binder 14 also appears to exhibit susceptibility to microwave radiation, resulting in microwave heating of the binder 14 regardless of the composition of the susceptor 18.

In view of the forgoing, microwave-susceptible materials for the susceptor 18 can be chosen to enable the susceptor 18, alone or in combination with the binder 14, to become sufficiently heated by microwave radiation so that the binder 14 volatilizes, the plasma is generated as a result of microwave irradiation of the vapors from the volatilized binder 14, and the particles 12 of the braze material 16 are heated and melted. Generally speaking, two heating mechanisms take place during exposure to a microwave field. Because microwave radiation has varying electric and magnetic fields, direct electric heating can be significant in certain nonconductive materials, whereas conductive materials are primarily heated through electromagnetic effects. More particularly, the heating mechanism in metallic materials (for example, particles 12) and other conductive materials is due to eddy current losses, and coupling with the microwave radiation 26 is generally the result of the particles 12 being sufficiently conductive to generate eddy currents induced by the magnetic field of the microwave radiation 26 and/or possessing a level of electrical resistivity capable of generating joule heating from the eddy currents. For nonconductive materials (for example, the binder 14 and susceptor 18) and other dielectric materials, the heating mechanism is due to dielectric losses (the rate of transformation of electric energy into heat for a dielectric material subjected to a changing electric field) that cause heating through dipole rotation. It is known that the magnetic loss component of susceptibility for a material in very fine powder size is dependent on factors such as microwave power and frequency. Conversely it is believed that, for a given microwave power and frequency, the interaction between microwave energy and a particular material will be optimum at a distinct particle size for conventional microwave conditions (about 2.45 GHz and about 1 to about 10 kW power). Particle sizes above or below the optimum particle size will not couple as well with microwave radiation. Consequently, suitable and preferred maximum particle sizes for the susceptor 18 will depend on the particular application, temperatures, and materials involved. Generally speaking, it is believed that a maximum particle size is on the order of about one millimeter, more preferably about 0.5 millimeter (about 35 mesh) and smaller. Minimum particle sizes can be as little as nanoscale, e.g., less than 100 nanometers.

Similarly, suitable and preferred maximum sizes for the metallic particles 12 will depend on the particular application, temperatures, and materials involved. Because the goal is for the metallic particles 12 to completely melt, the size of the particles 12 is preferably limited. Based on modeling studies using a 2.45 GHz microwave field, a maximum particle size is believed to be on the order of about 140 mesh (about 100 micrometers), more preferably about 2 to about 25 micrometers, and most preferably about 11 micrometers. Depending on the material and size of the braze particles 12, it is foreseeable that the particles 12 may also be susceptible to heating by the microwave radiation 26.

As evident from FIGS. 1 through 3, the susceptor 18 is not admixed with the braze material 16 or segregated into discrete layers within the braze material 16, as has been previously proposed. Instead, the susceptor 18 is present in the plasma generator 22 that is discrete and separate from the braze material 16 containing the braze particles 12. In FIGS. 1 and 2, the plasma generator 22 is spaced apart from the braze material 16 by pillars 30, resulting in a gap 28 that is preferably substantially uniform. The pillars 30 may be formed of a metallic material that maintains the gap 28 during the initial stage of the brazing process, but then melts to gradually reduce the gap 28 and the intensity of the plasma. More preferably, the pillars 30 are of sufficient size and formed of a material with a sufficiently high melting point so as not to melt during the brazing process. A nonlimiting example of a particularly suitable material for the pillars 30 is sintered alumina, which is non-suspecting in a microwave field unless raised to a sufficiently high temperature (as is the case if the susceptor 18 within the plasma generator 22 is formed of alumina). The pillars 30 can be placed on top of the braze material 16 or on the surface of the substrate 20/20A-B around the edges of the braze material 16. The pillars 30 can have various shapes, such as rings, blocks, or any other shape capable of supporting the plasma generator 22 above the outer surface of the braze material 16.

A preferred distance for the gap 28 between the braze material 16 and plasma generator 22 is believed to be up to about 0.15 inch (about 4 mm), more preferably about 0.0625 to about 0.125 inch (about 1.6 to about 3.2 mm), though lesser and greater distances are possible. In contrast, the embodiment of FIG. 3 shows the plasma generator 22 as directly contacting the outer surface of the braze material 16, with the result that a measurable gap is not intentionally present between the braze material 16 and plasma generator 22. In each case, the susceptor 18 of the plasma generator 22 serves as a microwave couplant that preferentially absorbs microwave energy, with the resulting heating of the plasma generator 22 causing or at least promoting volatilization of the binder 14 in the plasma generator 22 and subsequent generation of the plasma. As the plasma heats the braze particles 12 of the braze material 16, the plasma also heats the plasma generator 22, thereby promoting the absorption of microwave energy by the susceptor 18 and leading to further heating of the plasma generator 22 and, consequently, the braze material 16.

In FIGS. 1 and 2, the plasma (not shown) will be present within the gap 28 immediately between the braze material 16 and plasma generator 22, where the local pressure increase from the vapors of the volatilized binder 14 is present and, as a result, the plasma is generated. In the absence of a gap in FIG. 3, the plasma is believed to be concentrated in the porosity that forms within the plasma generator 22 as the binder 14 is volatilized, and also likely within the braze material 16 if the binder 14 was present. Because of direct contact between the braze material 16 and plasma generator 22, heat is also transferred from the plasma generator 22 to the braze material 16 by conduction, so that the plasma generator 22 is able to continue heating the braze material 16 even after the binder 14 is completely burned out and the plasma is essentially extinguished. This aspect of the embodiment of FIG. 3 is believed to potentially result in more reliable melting of the braze particles 12, especially if the particles 12 are formed of a high-temperature alloy, for example, a superalloy without a melting point suppressant.

In each of the embodiments of FIGS. 1 through 3, the plasma is believed to be generated and sustained as a result of the controlled release of vapors from the plasma generator 22, due in part to the developing porosity of the generator 22 as the binder 14 gradually volatilizes and migrates to an external surface of the generator 22. In this respect, it is foreseeable that the susceptor 18 within the plasma generator 22 could be a solid block containing open porosity and infiltrated with the binder 14, instead of the discrete particles shown in FIGS. 1 through 3 as dispersed in the binder 14.

In each of the embodiments depicted in FIGS. 1 through 3, the localized concentration of the plasma immediately between the plasma generator 22 and braze material 16 is promoted by enclosing the generator 22 in a housing 24 that is open on a side facing the braze material 16. The function of the housing 24 is to prevent the loss of vapors to the vacuum or low-pressure atmosphere surrounding the generator 22, and to focus the flow of vapors toward the braze material 16, during which time the vapors are ionized by the microwave radiation. The housing 24 is preferably formed of a material that is transparent to microwave radiation, a notable but non-limiting example of which is quartz ($SiO_2$). The size, shape and volume of the housing 24 will be largely determined by the area and volume of the braze material 16, and optimal sizes and shapes can be determined by routine experimentation.

Microwave radiation is preferably applied to the braze material 16 and plasma generator 22 in a multi-mode cavity, which as known in the art provides for a microwave field that does not establish a standing wave, but instead provides a uniform amplitude of both its magnetic and electric components. Alternatively, a single-mode cavity can be used, in which case a standing or traveling wave is propagated, enabling imposition, to a certain extent, the relative amplitudes of the electric and magnetic components of the microwave field. A wide range of microwave frequencies could be used with the present invention, though regulations generally encourage or limit implementation of the invention to typically available frequencies, e.g., 2.45 GHz and 915 MHz, with the former believed to be preferred. However, it should be understood that other frequencies are technically capable of use. A benefit of using a lower frequency is the greater associated wavelength, which may be better suited for higher power transmission or processing of larger components. Suitable microwave power levels will depend on the size and composition of the braze particles 12 and susceptor 18, but are generally believed to be in a range of about 1 to about 10 kW, though lesser and greater power levels are also foreseeable.

To further improve the particle-microwave interaction, the substrates 20 and 20A-B can be preheated prior to microwave brazing to enhance the susceptibility of the metallic particles 12 to microwave heating and thereby facilitate their melting. Preheating can be performed by any suitable means, such as with conventional radiative or inductive methods, with the use of a susceptor (e.g., SiC) media that will heat to very high temperatures when exposed to microwave radiation, or with a microwave-induced plasma as described in U.S. Pat. No. 6,870,124. Depending on the material used as the particles 12, a minimum preheat temperature is believed to be about 250° C., more preferably about 400° C., in order to have a significant impact on particle-microwave interaction, with maximum temperatures limited by the desire to avoid any microstructural change in the substrates 20 and 20A-B.

In view of the foregoing, the present invention makes possible the brazing of superalloy substrates with alloys having the very same composition as the substrate, as well as alloys with the same or even higher melting point as the substrate. For example, a nickel-base superalloy component can be joined or repaired with a braze material 16 containing particles 12 formed of the same nickel-base superalloy composition or another nickel-base alloy, in other words, an alloy whose base metal is the same as the base metal of the substrate. Furthermore, brazing can be completed with minimal heating of the substrates 20 and 20A-B, which as bulk materials generally reflect microwave radiation. As such, the brazing processes of this invention can be performed in a manner that avoids grain growth, incipient melting, recrystallization, and/or unfavorable phase formation in the alloy or alloys of the substrates 20 and 20A-B.

Figure 4:
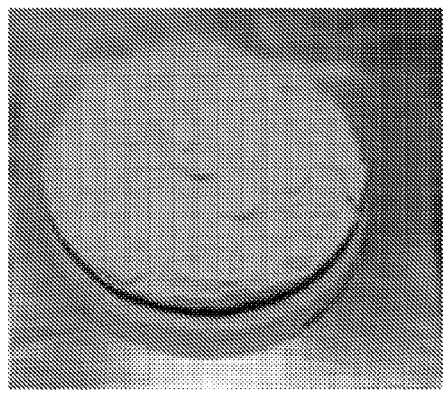
FIG. 4 is a scanned image showing a braze material and a plasma generator spaced apart from the braze material prior to being subjected to microwave radiation.
Figure 5:
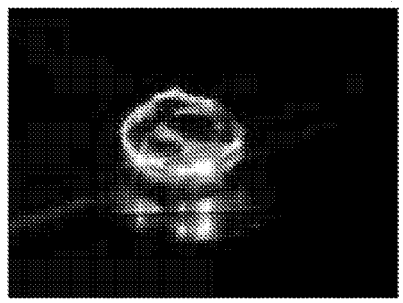
FIGS. 5, 6, and 7 are scanned images progressively showing the generation of a plasma between the braze material and the plasma generator of FIG. 4 when subjected to microwave radiation.
Figure 6:
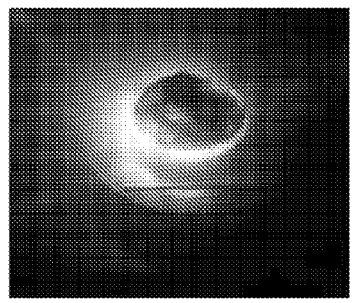
Figure 7:
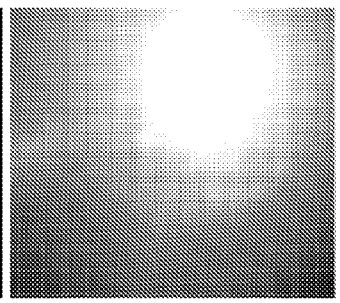
Figure 8:
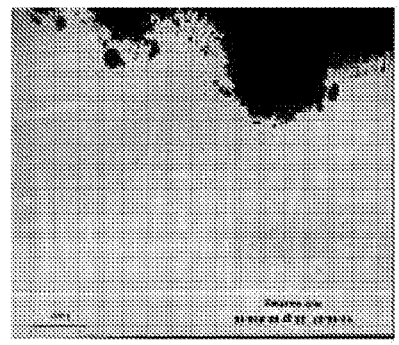
FIG. 8 is a scanned image of a photomicrograph showing the microstructure of a brazement produced with the braze material and plasma generator shown in FIG. 4 and the microwave radiation process of FIGS. 5 through 7.

In an investigation leading to the present invention, a nickel oxide powder and the aforementioned VITTA GEL® binder were combined to form a susceptor paste material, and a Ni-19Cr-10Si (nominal by weight) powder was separately combined with VITTA GEL® binder to form a braze paste material. These paste materials were dried to form relatively rigid masses, the resulting braze material was placed on a nickel plate and the resulting susceptor was supported above the braze material to form a gap therebetween, as seen in FIG. 4. The assembly was then placed in a chamber that was evacuated before subjecting the susceptor to microwave radiation at frequency and power levels of about 2.45 GHz and about 5 kW, respectively. FIG. 5 illustrates the initial appearance of a plasma, and FIG. 6 shows local plasma ignition approximately two minutes after the microwave field was first applied. Finally, FIG. 7 shows an intense plasma that was sustained for about five minutes until the braze alloy powder of the braze material was completely melted and flowed on the surface of the plate. FIG. 8 is a microphotograph showing a cross-section of the resulting brazement, evidencing the brazement to be dense, clean and free of inclusions, and well bonded to the plate without causing substrate melting.

Figure 9:
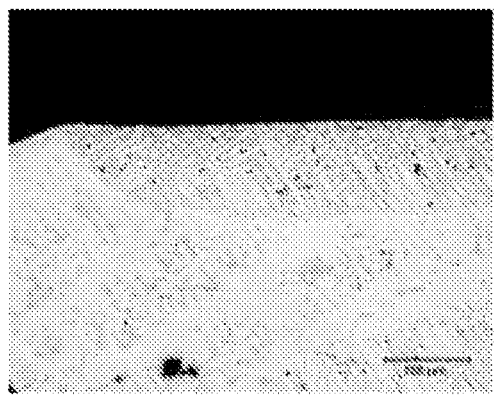
FIGS. 9, 10 and 11 are scanned images of progressively magnified photomicrographs showing the microstructure of a brazement produced on a surface of a superalloy component with the use of a brazing process within the scope of this invention.
Figure 10:
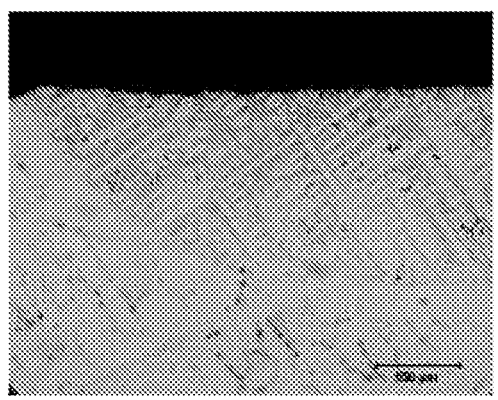
Figure 11:
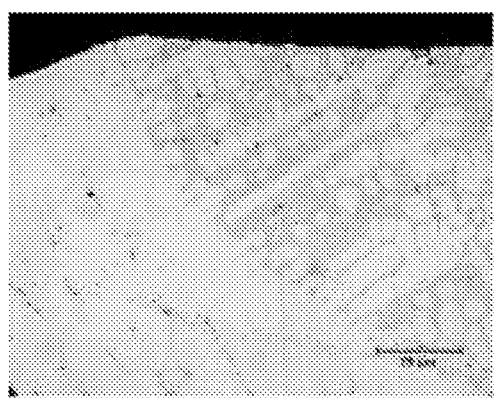
Figure 12:
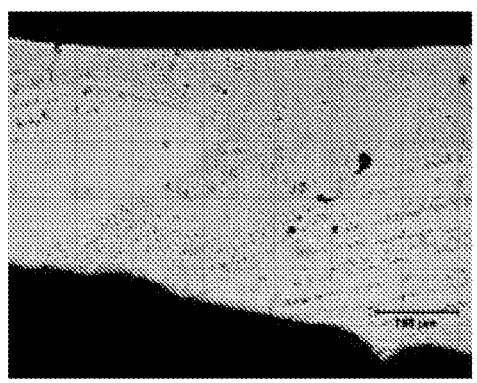
FIGS. 12, 13 and 14 are scanned images of progressively magnified photomicrographs showing the microstructure of a brazement produced within a surface hole of the superalloy component of FIGS. 9, 10 and 11 during the same brazing process.
Figure 13:
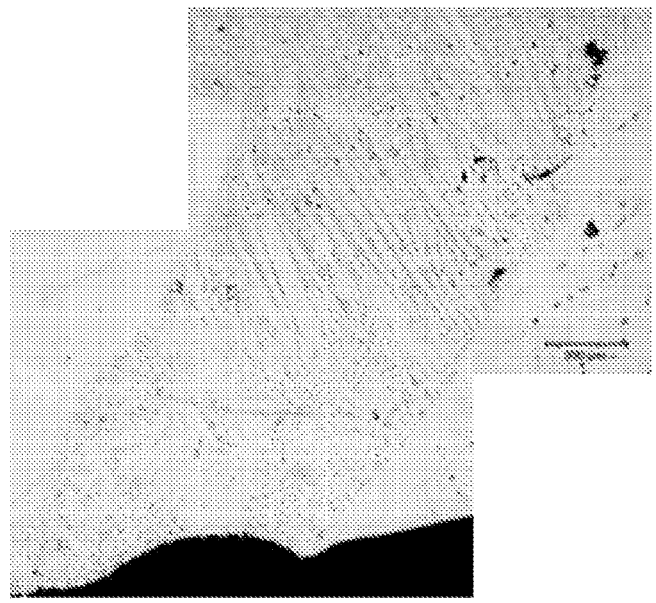
Figure 14:
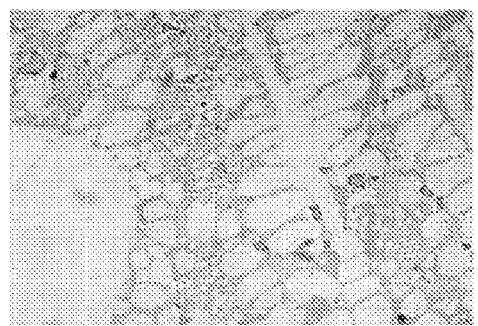

In another investigation, a similar experiment was performed on a single-crystal nozzle coupon formed of the nickel-base superalloy René N5, and in which a number of cooling holes were present. In this experiment, a susceptor paste material was formulated by preparing a powder mixture of about 80 weight percent nickel oxide powder and about 20 weight percent Ni-19Cr-10Si powder, which was then combined with the VITTA GEL® binder to achieve a paste consistency. A separate quantity of Ni-19Cr-10Si powder was combined with the VITTA GEL® binder to form a braze paste material. Both pastes were dried at about 200° C., after which the resulting braze material was placed directly on the surface of the coupon so that several cooling holes and the surfaces surrounding the cooling holes were covered. The resulting susceptor was supported above the braze material to define a gap therebetween. The assembly was then placed in a chamber that was evacuated before subjecting the susceptor material to microwave radiation at a frequency of about 2.45 GHz and a power level that was gradually increased to about 5 kW. After approximately two minutes, an intense plasma was generated and thereafter sustained until the braze alloy powder was completely melted and flowed on the surface of the coupon. FIGS. 9, 10 and 11 are microphotographs at progressively higher magnifications showing a cross-section at an edge of the resulting brazement, and FIGS. 12, 13 and 14 are microphotographs at progressively higher magnifications showing a cross-section of the brazement through one of the cooling holes. All six microphotographs evidence the brazement to be dense, clean and free of inclusions, and well bonded to the coupon without substrate melting. Furthermore, it was observed that epitaxial growth had taken place during solidification, resulting in a large portion of the brazement having the same crystallographic orientation as the underlying single-crystal substrate.

In view of the above, it can be appreciated that the present invention provides for a microwave brazing process by which a braze alloy can be completely melted with a very localized plasma generated by a microwave-susceptible material that does not become part of the brazement. The results of the investigations evidenced that the localized plasma produced concentrated and intense heating over a very controlled area defined by the susceptor, such that the substrate beneath the braze material remained relatively cool and did not undergo alteration of its microstructure. Further investigations conducted with a powder of René 142 superalloy as the braze alloy have also evidenced the highly localized heating capability that can be achieved with the process of this invention, and particularly the ability to heat and melt a high-temperature alloy on a substrate of the same material as the brazing material, or at least substantially the same melting temperature as the brazing material, without causing grain growth, incipient melting, recrystallization, or unfavorable phase formation in the alloy.

While the invention has been described in terms of particular embodiments, it is apparent that other forms could be adopted by one skilled in the art. Accordingly, the scope of the invention is to be limited only by the following claims.

The invention claimed is:

1. A brazing process comprising:
    applying a braze material to a surface of at least a first substrate;
    positioning a plasma-generating means in proximity to the braze material, the plasma-generating means comprising a microwave-susceptible material that is susceptible to heating by microwave radiation and a plasma-generating material capable of volatilizing and generating a plasma;
    subjecting the plasma-generating means to microwave radiation to volatilize the plasma-generating material and generate a plasma that melts a braze alloy of the braze material; and then
    allowing the molten braze alloy to cool, solidify, and form a solid brazement.

2. The brazing process according to claim 1, wherein the braze material comprises particles of the braze alloy.

3. The brazing process according to claim 1, further comprising the step of causing the plasma to be localized between the plasma-generating means and the braze material.

4. The brazing process according to claim 1, wherein the subjecting step is performed in a vacuum.

5. The brazing process according to claim 1, wherein the braze alloy is a superalloy that does not intentionally contain a melting point suppressant.

6. The brazing process according to claim 1, wherein the plasma-generating material is a binder in which the microwave-susceptible material is dispersed.

7. The brazing process according to claim 1, wherein the plasma is sustained during the subjecting step as a result of the plasma-generating material gradually volatilizing and migrating through the plasma-generating means to an external surface thereof to achieve a controlled release of vapors of the volatilized plasma-generating material from the plasma-generating means.

8. The brazing process according to claim 1, wherein the plasma-generating means is spaced apart from the braze material to define a uniform gap therebetween.

9. The brazing assembly according to claim 1, wherein the plasma-generating means directly contacts a surface of the braze material so as not to define an intentional gap therebetween.

10. A brazing process, comprising:
    applying a braze material to a surface of at least one substrate; and
    generating a localized plasma using a plasma generator in proximity to the braze material to melt a braze alloy of the braze material.

11. The brazing process according to claim 10, wherein generating the localized plasma comprises:
    subjecting the plasma generator to microwave radiation.

12. The brazing process according to claim 11, wherein the plasma generator comprises at least a plasma generating material that gradually volatizes when the plasma generator is subjected to microwave radiation to achieve a controlled release of vapors that are ionizable by the microwave radiation.

13. The brazing process according to claim 12, wherein the braze material comprises particles of the braze alloy bound by the plasma generating material.

14. The brazing process according to claim 13, wherein the braze alloy is a superalloy that does not intentionally contain a melting point suppressant.

15. The brazing process according to claim 12, wherein the plasma generator further comprises a microwave susceptible material that is susceptible to heating by the microwave radiation.

16. The brazing process according to claim 15, wherein the microwave susceptible material is dispersed in the plasma generating material.

17. The brazing process according to claim 10, wherein generating the localized plasma comprises generating the plasma between the braze material and the plasma generator.

18. The brazing process according to claim 11, wherein subjecting the plasma generator to microwave radiation is performed in a vacuum.

19. The brazing process according to claim 11, wherein the plasma generator is spaced apart from the braze material to define a gap therebetween.

20. The brazing process according to claim 11, wherein the plasma generator directly contacts the braze material so as to not define an intentional gap therebetween.

* * * * *